Figure 1:
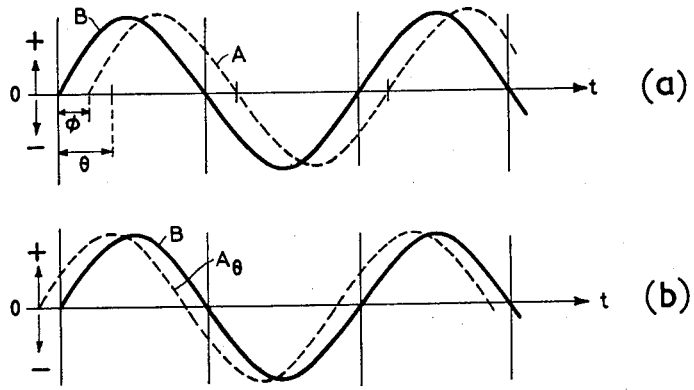

Nov. 14, 1961   H. ASPDEN ET AL   3,009,107
ELECTRICAL PHASE ANGLE COMPARATORS
Filed Feb. 10, 1958   5 Sheets-Sheet 2

Nov. 14, 1961  H. ASPDEN ET AL  3,009,107
ELECTRICAL PHASE ANGLE COMPARATORS
Filed Feb. 10, 1958  5 Sheets-Sheet 3

Inventors:
Harold Aspden
Peter Francis Abbink-Spaink
John Willis
By: Stevens, Davis, Miller & Mosher
Attorneys

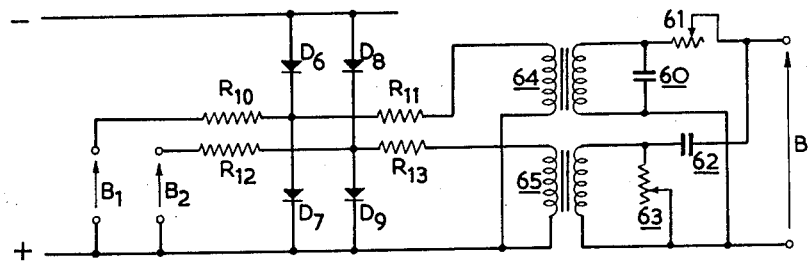
FIG. 9(b)
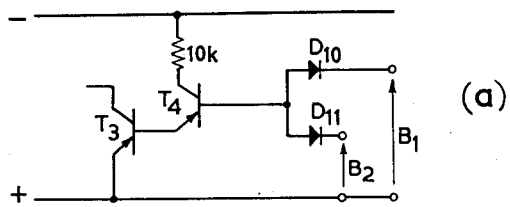
(a)
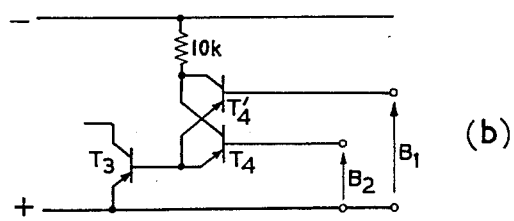
(b)
FIG. 10
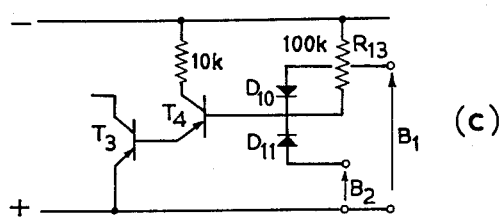
(c)
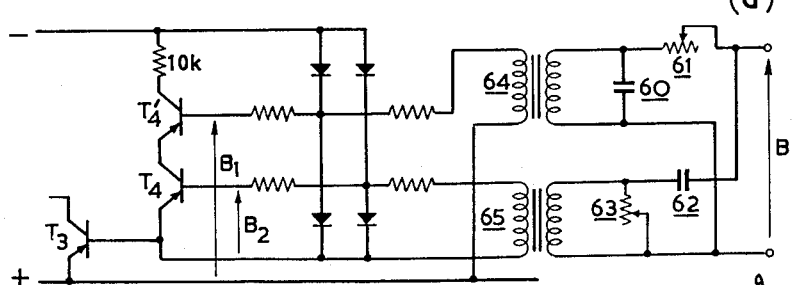
(d)

United States Patent Office 3,009,107
Patented Nov. 14, 1961

3,009,107
ELECTRICAL PHASE ANGLE COMPARATORS
Harold Aspden, London, Peter Francis Abbink-Spaink, Kidsgrove, and John Willis, Luton, England, assignors to The English Electric Company Limited, London, England, a British company
Filed Feb. 10, 1958, Ser. No. 714,221
Claims priority, application Great Britain Feb. 15, 1957
5 Claims. (Cl. 324—83)

This invention relates to phase angle comparators. In certain electrical measuring devices and control systems there is a need to compare the phase angle between two electrical signals with some fixed reference to provide an indication when the phase angle falls below or increases beyond the reference value. Phase angle comparators of the kind to be described are suitable for use in such applications.

According to the invention, a phase angle comparator comprises reactive circuit means for shifting the phase angle between two alternating electrical signals by a predetermined amount and polarity sensitive electrical circuit means for determining whether the polarity of one of the signals changes from positive to negative whilst the other signal has a definite polarity.

It is to be understood that this statement covers two conditions. If the polarity sensitive electrical circuit means operate to determine whether the polarity of one of the signals changes from positive to negative whilst the other signal has a definite polarity, they must also operate to determine whether the polarity of one of the signals changes from negative to positive whilst the other signal has a definite polarity. The reason for this is that the two alternating electrical signals are simple periodic signals and if one of the signals is changing from positive to negative during, say, the positive periods of the other signal, it must change from negative to positive during the negative periods of that signal.

It is also to be understood that the reactive circuit means for shifting the phase angle between the two alternating signals may comprise an input stage to the comparator. For example, if it is required to detect when one electrical signal changes from a condition in which it is lagging by more than, say, 50° behind the other electrical signal to a condition in which it is lagging by less than 50°, the reactive circuit means may operate as an input stage to advance the phase of the lagging signal by exactly 50° whereupon the phase angle comparator merely requires the polarity sensitive electrical circuit means to determine which signal is the leading signal. Alternatively, the reactive circiut means may be incorporated in some later stage of the phase angle comparator and used, in effect, to produce a third electrical signal related in phase to one of the input signals and operative to perform the necessary phase discrimination by causing the comparator to respond to the polarity conditions of the three signals. In yet another alternative, the reactive circuit means may be included in an input stage for the purposes already described and also in some later stage in the comparator for the other purposes, the combined actions of these circuits being operative to produce the resulting phase comparison.

According to one embodiment of the invention, a phase angle comparator comprises, in combination, reactive circuit means for shifting the phase angle between two alternating electrical signals by a predetermined amount, self-bias circuit means for producing a bias signal proportional to the amplitude of one of said signals, and polarity sensitive electrical circuit means responsive to the two alternating signals and the bias signal for determining whether the polarity of the dfference between the bias signal and the alternating signal from which it has been generated changes from positive to negative whilst the other alternating current signal has a definite polarity.

This embodiment of the invention has a special object. Whereas in the example just given by reference to the 50° phase shift the phase comparator will operate to detect when one signal passes a threshhold at which it lags 50° behind the other, it can also be regarded as a comparator which indicates when the phase difference crosses a threshhold of 130° leading. In effect, the comparator covers a 180° range of phase angle. The comparator indicates when the phase difference between the two signals falls within this 180° range. There are certain applications, as for example where the phase comparator is used as a control unit in certain types of protective circuit relay systems, where certain advantages arise in using a comparator which covers a range differing from 180°. One limit of the range may, for example, be 50° lagging and the other limit 100° leading. This requirement can be met by the embodiment of the invention just introduced owing to the action of the self-bias circuit means. These means operate to displace a signal supplied to the polarity sensitive electrical circuit means so that its periods of positive polarity become unequal to its periods of negative polarity.

According to another embodiment of the invention, a phase angle comparator comprises, in combination, reactive circuit means for shifting the phase angle between two alternating electrical signals in at least two stages by predetermined amounts to produce three relative-phase-shifted signals one of which has a predetermined phase relationship with one said electrical signal and the other two of which have different predetermined phase relationships with the other said electrical signal, and polarity sensitive electrical circuit means responsive to an and/or polarity combination of the two definite-phase-related relative-phase-shifted signals and the other relative-phase-shifted signal for determining whether the polarity of this linear combination of signals changes from positive to negative whilst the other relative-phase-shifted signal has a definite polarity.

Here, in order to produce the equivalent of an electrical signal which has alternate periods of unequal positive and negative polarity one of the signals is combined with a phase shifted version of itself. The combination may readily be accomplished by generating a resulting signal which has positive polarity during positive periods of either or both of the two basic signals. Thus by the use of what would, in computer technology, be referred to as an and/or circuit it is possible to produce a gating signal which can be compared in polarity with the other referred signal. It is to be understood that in order that the phase comparator should have a versatile range of control the other phase shift must be introduced to one or both of the gated signal and the two basic signals already referred to. The characteristic of a phase comparator according to this embodiment of the invention covers a range which may differ from 180°.

According to a feature of the latter embodiment of this invention, said polarity sensitive electrical circuit means comprise a transistor circuit connected to respond to the combined effect of the two definite-phase-related relative-phase-shifted signals by an input connection comprising two diodes, one of the signals being supplied to the transistor circuit through one diode and the other signal being supplied to the transistor circuit through the other diode, the conductive condition of the transistor circuit being thereby governed by the and/or polarity combination of the two signals, and said circuit means including means sensitive to the polarity of the uncombined signal for detecting when the conductive condition of the transistor circuit changes during a particular polarity period of this uncombined signal.

In this arrangement the two diodes constitute the and/or circuit. The parallel connection of the diodes provides for the supply of a positive control signal when there is positive polarity in either or both of two input signals.

According to a preferred feature of the invention, the transistor circuit includes a single p-n-p type transistor as its input stage and said input connection is made to the base of the transistor.

According to yet another embodiment of this invention, a phase angle comparator comprises reactive circuit means for shifting the phase angle between two alternating electrical signals by a predetermined amount and polarity sensitive electrical circuit means comprising an electrical energy storage circuit which is connected to other circuitry, forming said means, to be energized in accordance with the polarity of a said alternating electrical signal after the phase angle between the signals has been shifted (such a signal to be referred to as a relative-phase-shifted signal) and conditionally according to the polarity of the other relative-phase-shifted signal, de-energization means responsive to the polarity of the first mentioned relative-phase-shifted signal and connected to said energy storage circuit to promote its de-energization during the appropriate polarity periods of the signal, and additional de-energization means responsive to the polarity of the second mentioned relative-phase-shifted signal and connected to said energy storage circuit to promote its de-energization during particular polarity periods of this latter signal, and electrical detector means responsive to the energized conditions of the energy storage circuit and operative to indicate this condition.

This and the following embodiment of the invention utilizes an energy storage circuit to detect, as it were, the nature of the sequence of various polarity combinations as between the two compared signals. As will be shown, the detection of a leading, as opposed to a lagging, phase condition between the two signals can be determined in accordance with the nature of a time sequence of various polarity combinations of the two signals. This latter aspect of the invention is effective in using the energy storage circuit as a means for retaining an indication of the detection of one particular polarity combination so that if the appropriate polarity combination falls immediately after the termination of the first mentioned polarity combination, a basis for automatic detection by electrical means is provided.

According to a feature of the last mentioned embodiment of the invention, said polarity sensitive electrical circuit means comprise an electrical energy storage circuit, circuit means connected to allow said storage circuit to be energized only when one of the relative-phase-shifted signals has a particular polarity, a unidirectional conductive device connected to prevent said storage circuit from being energized, electronic switch means for rendering said unidirectional conductive device ineffective in preventing said storage circuit from being energized when the other relative-phase-shifted electrical signal has a particular polarity, and electrical detector means responsive to a change of the energized condition of the energy storage circuit and operative to indicate this change.

According to a further feature of the invention, the circuit means connected to allow the storage circuit to be energized according to the polarity of a relative-phase-shifted signal comprise an electronic switch device and an energy discharge resistor connected to said unidirectional conductive device and said storage circuit to be energized from a steady voltage source, the electronic switch device being connected to a circuit network, in which a series combination of the energy storage circuit and the unidirectional conductive device is shunted by the energy discharge resistor, and being responsive to the controlling relative-phase-shifted signal to control the voltage signal supplied to this network from the voltage source and thereby tend to energize the energy storage circuit during appropriate half cycles of the controlling signal, the unidirectional conductive device being non-conductive during these half cycles, but being shunted by said electronic switch means so that the energy storage circuit can become energized when the other relatively-phase-shifted signal has the appropriate polarity, the unidirectional conductive device being effective during intermediate half cycles to permit the de-energization of the storage circuit through the energy discharge resistor, and said means responsive to a change of the energized condition of the energy storage circuit being connected to respond to the magnitude of the voltage signal across the unidirectional conductive device.

According to still another embodiment of this invention, a phase angle comparator comprises reactive circuit means for shifting the phase angle between two alternating electrical signals by a predetermined amount and polarity sensitive electrical circuit means comprising an electrical energy storage circuit which is connected to other circuitry, forming said means, to be energized in accordance with the polarity of a said alternating electrical signal after the phase angle between the signals has been shifted (such a signal to be referred to as a relative-phase-shifted signal) and conditionally according to the character of the polarity change of the other relative-phase-shifted signal during particular polarity half cycles of the first mentioned relative-phase-shifted signal, and electrical detector means responsive to a change of the energized condition of the energy storage circuit and operative to indicate this change.

The distinction between this and the last mentioned embodiment of the invention arises because instead of detecting the energized condition of the energy storage circuit the new embodiment involves a detection of the change of the energized condition of the storage circuit.

According to another feature of the last mentioned embodiment of the invention, said polarity sensitive electrical circuit means comprise an electrical energy storage circuit, electronic switch means connected to allow said storage circuit to be energized or de-energized only when a particular combination of polarities exists between one of the relative-phase-shifted electrical signals and an electrical signal bearing a predetermined phase relationship to this signal, electronic switch means for charging and discharging the energy stored in the storage circuit according to the polarity of the other relative-phase-shifted electrical signals, and electrical detector means responsive to a change of the energized condition of the energy storage circuit and operative to indicate this change.

According to a further feature of the invention, said electrical energy storage circuit comprises a capacitor and said electronic switch means connected to allow the storage circuit to be energized comprises two electronic one-way-acting switch devices each of which is controlled in accordance with the polarity of a different one of the relative-phase-shifted signals and the electrical signal bearing a predetermined relationship to this signal, said electronic switch means for discharging the storage circuit comprising a two-way-acting electronic switch device which is controlled in response to the other relative-phase-shifted signal to occupy one switch position when this latter signal has one polarity and to occupy the other switch position when the signal has the other polarity, this two-way-acting switch device having its common pole connected in series with the two electronic one-way-acting switch devices, one of its other poles connected to an energizing supply source so as to energize the storage device when a connection exists between this pole and the common pole and the two one-way-acting switch devices are in their closed poitions, and its remaining pole connected to an output circuit which when energized is effective in indicating that the condition of the energy storage circuit is changing.

According to yet another feature of the last mentioned embodiment of the invention, said polarity sensitive electrical circuit means comprise an electrical energy storage circuit, electronic switch means connected to allow said storage circuit to be energized or de-energized only when a particular combination of polarities exists between one of the relative-phase-shifted electrical signals and the other relative-phase-shifted signal, electronic switch means for charging and discharging the energy stored in the storage circuit according to the polarity of a signal having a predetermined phase relationship to one of said relative-phase-shifted signals, and electrical detector means responsive to a change of the energized condition of the energy storage circuit and operative to indicate this change.

According to a further features of the invention, said electrical energy storage circuit comprises a capacitor and said electronic switch means connected to allow the storage circuit to be energized comprises two electronic one-way-acting switch devices each of which is controlled in accordance with the polarity of a different one of the relative-phase-shifted signals, said electronic switch means for discharging the storage circuit comprising a two-way-acting electronic switch device which is controlled in response to said signal having a predetermined phase relationship to one of said relative-phase-shifted signals to occupy one switch position when this signal has one polarity and to occupy the other switch position when the signal has the other polarity, this two-way-acting switch device having its common pole connected in series with the two electronic one-way-acting switch devices, one of its other poles connected to an energizing supply source so as to energize the storage device when a connection exists between this pole and the common pole and the two one-way-acting switch devices are in their closed positions, and its remaining pole connected to an output circuit which when energized is effective in indicating that the condition of the energy storage circuit is changing.

According to still another feature of the last mentioned embodiment of the invention, said polarity sensitive electrical circuit means comprise an electrical energy storage circuit, circuit means connected to allow said storage circuit to be energized only when a particular combination of signal polarities exists as between the two relative-phase-shifted signals, energy discharge means for allowing the storage circuit to lose its stored energy during a small fraction of a cycle following the termination of periods when said polarity combination exists, other circuit means connected to provide an indication of a condition in which the same polarity combination exists as between one of these signals and a polarity-inverted version of the other of these signals, and electrical detector means sensitive to the simultaneous indication of this condition and the state of energization of said energy storage circuit and operative to indicate when this condition is satisfied during part of a cycle of change immediately following a period of energization of the storage circuit.

According to a further feature of the invention, said energy storage circuit comprises a capacitor and said energy discharge means comprise a resistor connected to shunt the capacitor, and the circuit means connected to allow the storage circuit to be energized in dependence upon the polarities of the two relative-phase-shifted signals comprise an electronic switch-acting device which is connected to an energizing supply source and is operative to permit the energization of the storage circuit when the appropriate polarity combination exists as between the two relative-phase-shifted signals.

According to a still further feature of the invention, the conductive condition of the electronic switch-acting device is controlled by a control signal derived from said energizing supply source, the said circuit means including two electronic switch devices individually responsive to the polarity of a different one of said two relative-phase-shifted signals and connected between said energizing supply source and said electronic switch-acting device to govern the magnitude of said control signal and render it effective in allowing the energization of said storage circuit only when the appropriate polarity combination exists as between the two relative-phase-shifted signals.

According to an alternative further feature of the invention, the aforementioned other circuit means includes two electronic switch devices individually responsive to the polarity of a different one of said two relative-phase-shifted signals and connected between said energizing supply source and said electrical detector means to govern the magnitude of a signal supplied to these detector means and cause its amplitude to be dependent upon the existence of the appropriate polarity combination as between the two relative-phase-shifted signals, said detector means comprising a further electronic switch device responsive to the amplitude of the input signal to the detector device and also to the charge of said capacitor and operative to provide an output indication in dependence upon the mutual effects of these quantities.

In the embodiments of the invention and its various features now to be described with reference to the accompanying drawings the various electronic switch-acting devices are shown schematically or where shown in detail, are shown as transistor devices.

Figure 2:
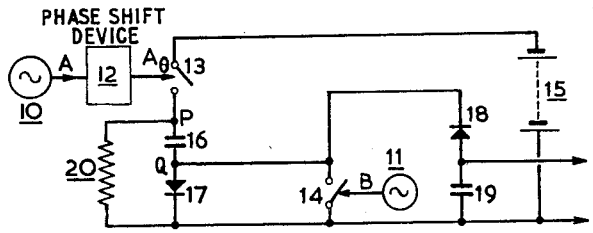
Figure 3:
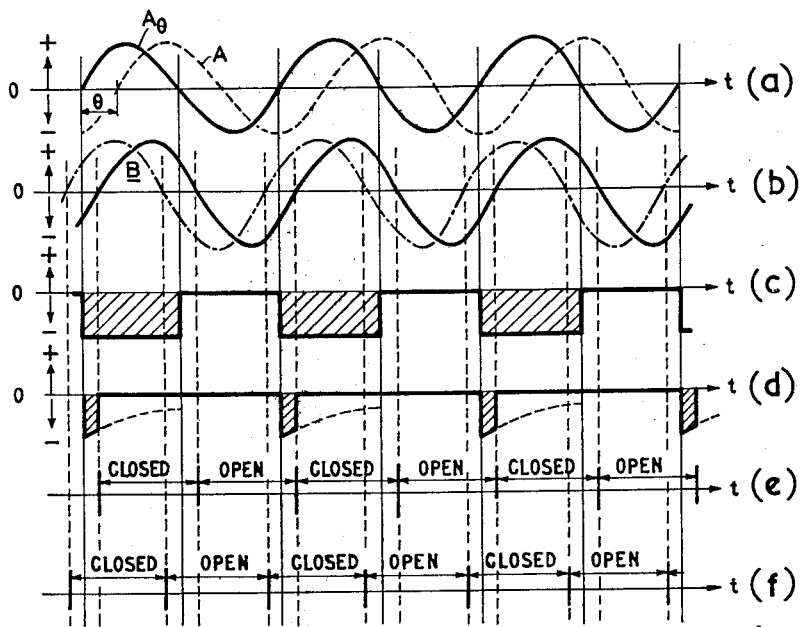
Figure 4:
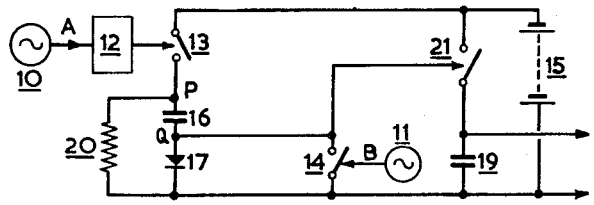
Figure 5:
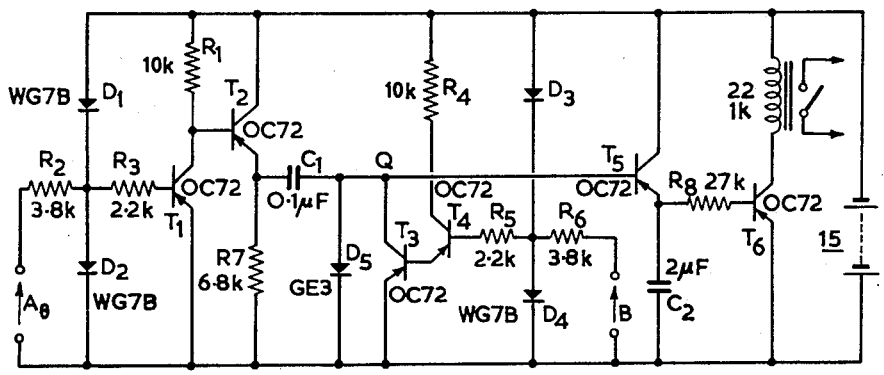
Figure 6:
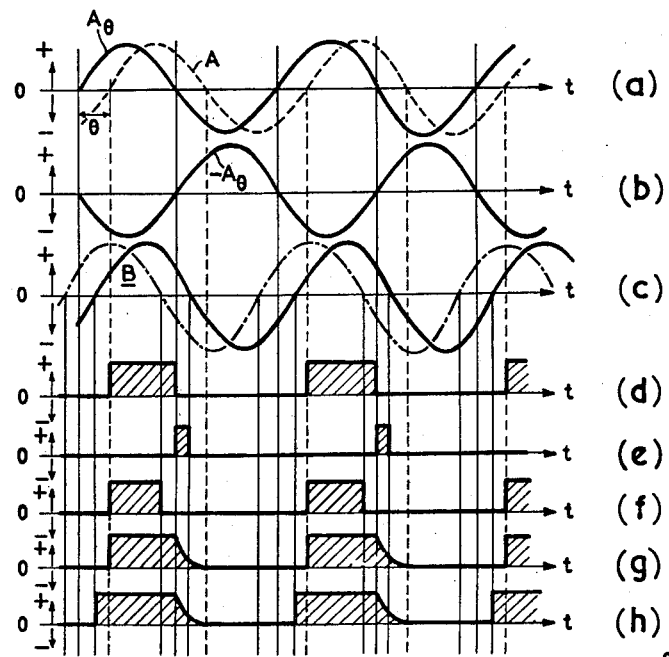
Figure 7:
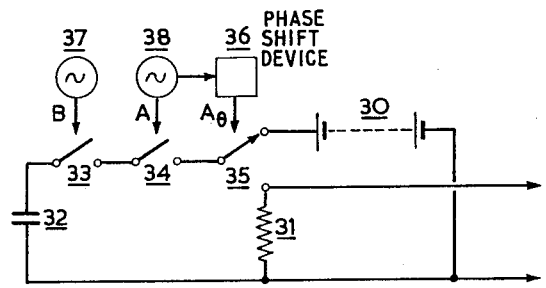
Figure 8:
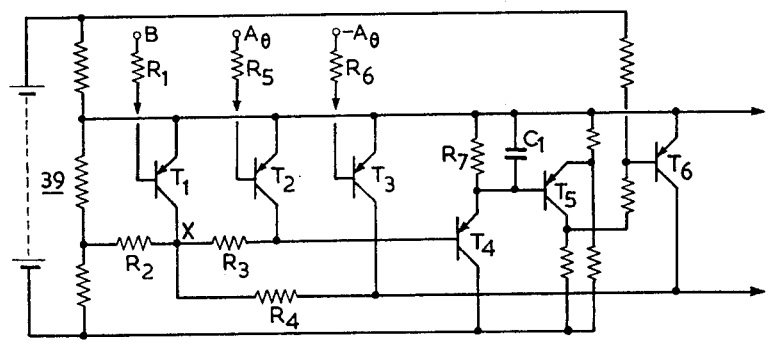
Figure 11:
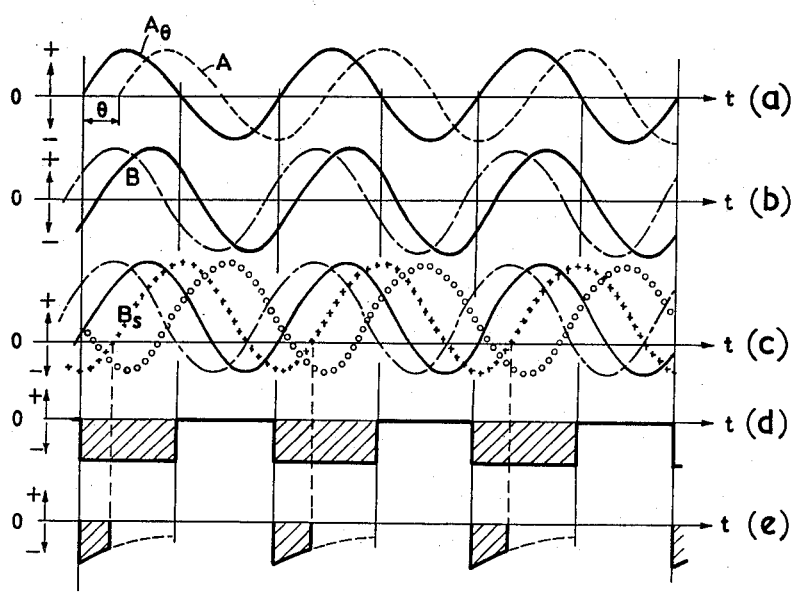
Figure 12:
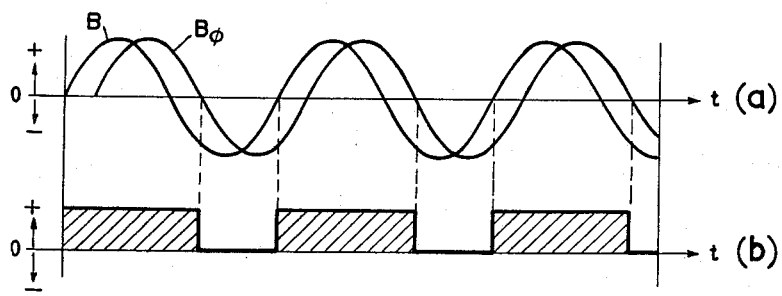

In the accompanying drawings:

FIG. 1 illustrates a series of wave forms to which reference will be made in describing the functions of the phase angle comparator, FIG. 2 illustrates schematically a circuit which embodies the invention in one of its forms, FIG. 3 illustrates a series of wave forms applicable to the operation of the circuit shown in FIG. 2, FIG. 4 shows a modification of the circuit shown in FIG. 2, FIG. 5 shows a detailed circuit of the kind shown in FIG. 4, FIG. 6 illustrates a series of wave forms depicting the operation of another form of phase comparator embodying the invention, FIG. 7 illustrates schematically a circuit working on the principles indicated in FIG. 6, FIG. 8 shows in detail an alternative circuit to that shown in FIG. 7, FIG. 9 shows alternative circuit arrangements which may be utilized in a phase comparator covering an adjustable range of phase angle, FIG. 10 shows various detector circuits which may be responsive to the output signals supplied by a circuit of the form shown in FIG. 9, FIG. 11 shows further wave forms applicable to a phase angle comparator which covers a range of phase angle differing from 180°, and FIG. 12 shows another set of wave forms applicable to an alternative principle of phase comparison covering a range of phase angle differing from 180°.

A principle of phase angle comparison familiar to those skilled in the appropriate art involves a measurement of the fraction of a cycle during which the two compared alternating signals both have positive polarity. In carrying this principle into effect it is necessary to use some form of polarity coincidence device and an integrating device. It is difficult to render such a system independent of supply voltages and the like and reliable operation is only obtained by frequent calibration. Where, as may often be the case, the criterion of operation of a control system is that the phase angle between two electrical signals is greater than a predetermined value, a phase angle comparator of the form just mentioned may be applied by comparing the voltage output from the integrating device with some fixed reference voltage to produce a difference signal suitable for exercising the appropriate control.

In such a situation we have found it to be preferable to shift the phase angle between the relevant signals by an amount corresponding to the predetermined value and then somehow detect which of the two signals is the lagging or leading signal. By this invention, this detection is based upon the character of the polarity change of one signal during a particular polarity period of the other signal. If such a change is detected then, without recourse to integrating devices, an operating condition is indicated.

Referring to FIG. 1(a) two signal wave forms B and A are shown, signal B being represented by the full curve and signal A being represented by the broken curve. Signal A is shown to lag behind signal B by an angle $\phi$. It is assumed that the phase angle comparator is required to detect whether the angle $\phi$ is greater than or less than a predetermined angle $\theta$.

In FIG. 1(b) the signal A is shown to be phase advanced by an angle $\theta$ and is now denoted $A_\theta$. The comparison now becomes a matter of detecting whether or not the signal $A_\theta$ leads the signal B. This detection is conveniently based upon the character of the polarity change of, say, the signal $A_\theta$ whilst the signal B has a particular polarity. Thus, for example, during periods of positive polarity of the signal B the polarity of the signal $A_\theta$ will change from positive to negative only if $A_\theta$ leads B. If the signal $A_\theta$ lags behind the signal B then the relevant polarity change will be from negative to positive. One way in which this polarity change can be detected consists in converting the signal $A_\theta$ into a square wave having corresponding polarity periods and determining whether or not a rising step in the signal occurs during a period of positive polarity of the signal B. Such a square form provides a suitable basis for the generation of pulses which are positive-going or negative-going according to the character of the steps in the square signal.

This will be more readily understood with reference to FIG. 2. Here, two alternating input signals A and B are supposed to be supplied by sources 10 and 11 respectively. The signal A is passed through a phase-shifting device 12 which advances the phase of the signal A by an angle $\theta$. This phase advanced signal is applied to control the position of a switch 13, the switch being closed when the phase advanced signal is positive and open when the signal is negative. Similarly, the signal B is applied, but this time without any phase shift, to control the position of a switch 14, this switch also being closed when B is positive and open when B is negative.

Switches 13 and 14 are connected in a circuit which is energized from a battery 15. The switch 13 is connected in series with a capacitor 16 and a rectifier 17, this series connected circuit being energized directly from the battery 15. The rectifier 17 is connected with respect to the polarity of the battery 15 as shown in the drawing. The switch 14 is connected directly across the rectifier 17 to short-circuit the rectifier when closed. Also connected across the rectifier 17 and similarly shunted by the switch 14 are a series connected rectifier 18 and a capacitor 19. The voltage across the capacitor 19 constitutes the output signal from the comparator. Finally, the capacitor 16 is shunted by a resistor 20, which is shown in the drawing to be connected directly across the series connected capacitor 16 and rectifier 17.

In operation, the circuit shown in FIG. 2 provides an output signal when the signal B leads the signal A by an angle less than $\theta$ or lags behind the signal A by an angle less than $180° - \theta°$.

This operation will be fully understood with reference to FIG. 3. In FIG. 3(a) the wave form of the signal A is shown dotted as a function of time $t$. The full curve indicates the phase advanced version of the signal A, the angle of advance $\theta$ being the angle shown. In FIG. 3(b) two wave forms are shown, one, represented by the full line, being that of a signal which leads the signal A by an angle less than $\theta$, and the other wave form, represented by the chain-dotted curve, corresponding to a signal which leads the signal A by an angle greater than $\theta$. The function of the comparator is, therefore, to distinguish between two signals of the form shown in FIG. 3(b). The signals, in effect, would represent different possible forms of the signal B.

The wave form in FIG. 3(c) illustrates the voltage of the point P in FIG. 2. The voltage of this positive end of the battery 15 is taken to be zero and, accordingly, when the switch 13 is closed during the positive half cycles of the phase advanced version of the signal A the voltage at P becomes negative.

The voltage at P undergoes sudden rises and falls as the phase advanced version of the signal A passes through zero. These sudden changes of voltage are communicated through the capacitor 16 to the point Q shown and appear at Q as exponentially decaying pulses. However, these pulses are only apparent if the switch 14 is open and only the negative pulses may appear since the positive ones are absorbed by the rectifier 17. The wave form of the signal appearing at Q when the switch 14 is open therefore has the form shown in FIG. 3(d). The broken-lines indicate the nature of the decay, the pulse being terminated only when switch 14 closes.

In fact, the switch 14 must open and close once per cycle. Thus, the presence of a pulse type signal at Q is dependent upon the phase of the signal B. In FIGS. 3(e) and 3(f) the positions of the switch 14 corresponding to the different wave forms shown in FIG. 3(b) are indicated as a function of time. FIG. 3(e) shows the position of the switch 14 corresponding to the full curve in FIG. 3(b). FIG. 3(f) corresponds to the chain-dotted curve in FIG. 3(b). It is seen that in the case corresponding to the wave form shown in FIG. 3(e) the switch 14 is open when pulses can occur at Q. Accordingly, the switch 14 will not prevent these pulses from being present. On the other hand, FIG. 3(f) shows that the switch 14 is closed when pulses can occur at Q and these pulses are, therefore, prevented from so occurring.

The final result is that if the signal B has a wave form correspondiing to that shown by the full line in FIG. 3(b), pulses will appear at Q. On the other hand, if the signal has the form indicated by the chain-dotted line in FIG. 3(b) these pulses will not occur. The presence or absence of the pulses, therefore, serves to distinguish the two signals shown in FIG. 3(b). When the signal B leads the signal A by an angle less than $\theta$ pulses are present at Q. Otherwise, if the signal B leads the signal A by an angle greater than $\theta$ no pulses are present. The function of the rectifier 18 is to allow these pulses to be fed into the capacitor 19 but to prevent the capacitor from returning current through the rectifier. The design of the circuit shown in FIG. 2 is based upon the assumption that the phase difference between the signals A and B is normally greater than $\theta$. As long as this condition prevails, there will be no potential drop across the capacitor 19. However, as soon as the phase difference falls below $\theta$ the capacitor 19 will acquire charge and provide an output signal.

Assuming that the capacitor 19 is provided with a leakage path, the circuit will have a resetting action.

The principle of phase comparison involved in the circuit shown in FIG. 2 uses the capacitor 16 as an energy storage circuit. The true function of this circuit is the detection of the nature of the time sequence of various polarity combinations as between the two compared signals. Thus, referring to FIG. 3 and considering the time sequence of the polarity combinations of signals $A_\theta$ and B, where B is as represented by the chain-dotted curve of FIG. 3(b), the time sequence of the signal polarity combination is:

| $A_\theta$ | + | + | − | − |
|---|---|---|---|---|
| B | + | − | − | + |

Case (i)

If B is as represented by the full curve in FIG. 3(b), the time sequence of the signal polarity combination is:

| $A_\theta$ | + | + | − | − |
|---|---|---|---|---|
| B | − | + | + | − |

Case (ii)

The energy storage circuit (the capacitor 16) is connected to be energy charged according to the polarity of the signal $A_\theta$ and conditionally according to the polarity of the signal B. When $A_\theta$ and B are both positive capacitor 16 is charged. The capacitor discharges if $A_\theta$ is negative and regardless of the polarity of B, and the condition is detected when a particular energized condition of the capacitor occurs during a particular polarity period of B. In the case of FIG. 2 there is an output indication if the capacitor 16 is ever charged during a negative period of the signal B.

This is readily understood as follows:

The charged condition C arises when $A_\theta$ is positive provided B is positive.

The discharged condition D arises when $A_\theta$ is negative and regardless of the polarity of B.

Conditions of charge or discharge prevail in other circumstances.

The output indication is provided if condition C exists when B is negative.

Thus, extending the two tabulations of the polarity combination sequences:

| $A_\theta$ | + | + | − | − |
|---|---|---|---|---|
| B | + | − | − | + |
| Capacitor condition | C | C | D | D |

OUTPUT INDICATION

Case (i)

| $A_\theta$ | + | + | − | − |
|---|---|---|---|---|
| B | − | + | + | − |
| Capacitor condition | D | C | D | D |

NO OUTPUT INDICATION

Case (ii)

The necessary phase discrimination is therefore obtained by an application of these principles in FIG. 2.

The detection principle applied in FIG. 2 resides in the detection of a state of energization of the energy storage circuit in conditional dependence upon the simultaneous detection of a particular polarity of the signal whose other polarity conditions the energization of the storage circuit in response to the polarity of the other signal.

An alternative detection principle evident from the tabulations already presented involves the detection of when a discharged condition D follows a charged condition C during a particular polarity period of the signal B. If this change of the energized condition occurs during a negative half cycle of B an indication is required. Otherwise if it occurs during a positive half cycle of B no such indication is required. Such a result can be achieved by a pulse extending and gating technique presently to be described (see FIG. 8), though with reference to a less complex system than that shown in FIG. 2.

Depending upon the load imposed upon a circuit of the form shown in FIG. 2 it may be necessary for the capacitor 19 to have a large capacitance. In this event it may not be practical to delay the operation of the comparator until a sufficient number of pulses have been supplied to fully charge the capacitor 19. To overcome this difficulty a cathode follower device can be utilized as an output stage of the circuit shown in FIG. 2. Alternatively, the circuit shown in FIG. 4 may be used. In this circuit no rectifier 18 is necessary. Capacitor 19 is energized through a switch 21 which is closed only when pulses are apearing at Q. In operation as soon as pulses are present at Q, the capacitor 19 is charged directly from the battery 15 and can draw as much energy as it requires to become fully charged regardless of the charge available from the capacitor 16.

It will be understood that the criterion of operation of the circuit can be modified by arranging for one of the switches 13 or 14 to be closed when the controlling signal is negative and open when the controlling signal is positive. The action then really corresponds to the operation just described with a signal B in antiphase; the operation of the circuit is, in effect, inverted. A detailed embodiment of the invention working on principles which are a modified form of those just mentioned will now be described with reference to FIG. 5. A phase-shifting unit corresponding to 12 in FIG. 2 is not shown in this figure.

In the circuit shown in FIG. 5 the switches of FIG. 4 take the form of transistors which are rendered conductive or non-conductive between their collectors and emitters in response to signals applied to their base-emitter circuits. Suitable values of the various circuit components are shown in the drawing, resistors being denoted by the general symbol R and distinguished by a suitable numerical suffix, and protective diodes and transistors being correspondingly denoted by the general symbols D and T respectively. The input signals to the circuit are the signals $A_\theta$ and B, $A_\theta$ signifying the signal A when phase-shifted in some arbitrary sense by an angle $\theta$. The transistor $T_1$ is connected across the battery 15 with a suitable resistor $R_1$ in its collector circuit. The junction between the collector of $T_1$ and the resistor $R_1$ is connected to the base of a further transistor $T_2$. This latter transistor $T_2$ functions as the switch 13 since it is rendered conductive only when the base signal is negative, which is when transistor $T_1$ is non-conductive. The signal $A_\theta$ is applied to the base-emitter circuit of $T_1$ which includes resistors $R_2$ and $R_3$ which act to limit the base current, and diodes $D_1$ and $D_2$ which serve to protect a transistor $T_1$ against overvoltages. The collector-emitter of $T_1$ is only non-conductive when its base is positive with respect to the emitter. This is when $A_\theta$, as measured in the sense of the voltage of the base with respect to the emitter, is positive.

The signal B is fed into a corresponding circuit comprising resistors $R_4$, $R_5$ and $R_6$, and diodes $D_3$ and $D_4$, as shown. The control transistor in this case is the transistor $T_4$, and this is rendered conductive when the signal B, having in this case a voltage sense as the voltage of the emitter with respect to the base, is positive. The emitter of the transistor $T_4$ is connected to the base of the transistor $T_3$, and as this transistor $T_3$ has its emitter connected to the positive terminal of the battery 15 the transistor $T_3$ becomes conductive when the transistor $T_4$ is conductive. Transistor $T_3$ corresponds to the switch 14 shown in FIG. 2, "closing," in effect, when signal B is positive.

Connected to the emitter of the transistor $T_2$, in a manner analogous to the connections to the switch 13 in FIG. 2, are capacitor $C_1$ and resistor $R_7$, which correspond respectively to capacitor 16 and resistor 20 in FIG. 2. The collector-emitter circuit of the transistor $T_3$ has connections corresponding to those of the switch 14 and the diode $D_5$ functions as the rectifier 17. The point Q, in this case shown as the junction between the capacitor $C_1$ and the diode $D_5$, is connected to the base of a transistor $T_5$ whose function is analogous to that of the switch 21 in FIG. 4. Its collector-emitter circuit, which includes a capacitor $C_2$, is directly energized from a battery 15. This capacitor $C_2$ corresponds to the capacitor 19 in FIGS. 2 and 4 and receives charge when the transistor $T_5$ is rendered conductive by the presence of pulses at Q which are negative going with respect to the positive terminal of the battery 15.

In this particular circuit the presence of a potential drop across the capacitor $C_2$ is needed to operate a relay 22 and a transistor stage comprising a transistor $T_6$ and resistor $R_8$ is connected so as to energize the operating coil of the relay 22 in response to an input signal drawn from the terminals of the capacitor $C_2$.

The operation of the circuit shown in FIG. 5 as a phase angle comparator will be apparent from the foregoing description of FIGS. 2 and 4 and the references which have been made to FIG. 3. A particular advantage of this circuit is that its operation is substantially independent of the voltage of the battery 15.

Another form of phase comparator embodying the invention and a number of its subsidiary features operates on principles which will be described with reference to FIG. 6.

In FIGS. 6(a) and 6(c) the wave forms shown in FIGS. 3(a) and 3(b) respectively are reproduced. An additional wave form shown in FIG. 6(b) is presented. This wave form represents a signal which is in antiphase with the phase advanced version of the signal A. The principle of phase comparison then consists of comparing two sets of three signals and detecting the states of simultaneous positive polarity as between the signals. The phase comparison is effected between the three signals A, $A_0$ and B. A coincidence of positive polarity as between these three signals is indicated in FIG. 6(d) for the case in which B is represented by the full curve in FIG. 6(c). For the case in which B is represented by the chain-dotted curve in FIG. 6(c) the polarity coincidence is as indicated in FIG. 6(f). The indication takes the form of signal pulses which have a duration equal to that of the simultaneous polarity coincidence. The second set of three signals consists of the signals A, $-A_0$ (which is the signal shown in FIG. 6(b)) and B. In the case in which B is represented by the full curve a polarity coincidence as between the three signals does occur once per cycle as is indicated in FIG. 6(e). It will be seen that the pulses in FIG. 6(e) follow immediately after the pulses in FIG. 6(d). On the other hand, in the case in which B is represented by the chain-dotted curve no polarity coincidence as between the three signals occurs and consequently no pulses corresponding to those shown in FIG. 6(e) will need to be produced in this case.

The principle of phase comparison consisting in detecting the polarity coincidence as between the signals of the two sets of three signals may readily be carried into effect by detecting a state in which pulses are present in two distinct wave forms and distinguishing this state from a state in which pulses are present only in one wave form.

A simple form of circuit operable on the principles just described is illustrated schematically in FIG. 7. Referring to FIG. 7 a circuit is shown to comprise a battery 30, a resistor 31, a capacitor 32, three switches 33, 34 and 35, a phase shift unit 36 and two signal sources 37 and 38. The signal B is supplied by the source 37 and operates the switch 33 to close it when B is positive and hold it open when B is negative. The source 38 supplies the signal A and controls switch 34 in an exactly similar manner. Switches 33 and 34 are one-way switches and are connected in series and to the common pole of the two-way switch 35. The capacitor 32 is also connected in series with the switches 33 and 34 and the whole series combination is so arranged that in one position of the switch 35 it is connected directly across the battery 30 and in the other position of the switch 35 it is connected directly across the resistor 31. This resistor 31 constitutes a load resistor and for the purpose of this description may be regarded as affording an output signal. The position of the switch 35 is determined by the polarity of the signal $A_0$ which is supplied by the unit 36 whose function is to phase-shift the signal A by the angle $\theta$. To correspond with the wave form shown in FIG. 6 this phase shift must be regarded as a phase advance; when $A_0$ is positive the switch 35 has the position shown in the FIG. 7 and when $A_0$ is negative, the switch occupies the other position.

In operation when B, A and $A_0$ are simultaneously positive the capacitor 32 is directly connected across the battery 30. When A and B are both positive whilst $A_0$ is negative, the capacitor 32 is connected across the resistor 31. This latter condition corresponds to simultaneous positive polarities of the signals B, A and $-A_0$. Thus when in operation B has a phase relationship with respect to A such that pulses may occur simultaneously in the wave forms 6(d) and 6(e), this corresponding to the connection of the capacitor 32 alternately to the battery 30 and a resistor 31 once per cycle, the battery 30 is able to supply power to the resistor 31 by the intermediary storage agency of the capacitor 32. On the other hand if the phase relationship between A and B is such that once every cycle the capacitor 32 is connected only to the battery 30 or, alternatively, only to the resistor 31, then the capacitor does not function to transfer electrical charge from the battery to the resistor and no output signal is afforded from the system. The circuit described, therefore, operates to distinguish between two signals of the form shown in Fig. 6(c), that is the system functions to distinguish between a signal B which leads the signal A by an angle less than $\theta$ and one which leads the signal A by an angle greater than $\theta$.

To avoid a false phase detection which might result when the switch 35 changes transiently and unwantedly from a position in which it connects capacitor 32 directly to the battery 30 to a position in which it connects capacitor 32 to resistor 31, the whole system can be used as part of a phase angle comparator which only operates when the capacitor 32 discharges through the resistor 31 more than once in rapid succession. To this end, some suitable capacitor device may be included in the output stages of the circuit. A spurious switch action of switch 35 is quite possible where the switches comprise electronic devices and these devices become subject to the action of spurious pulses.

In a practical embodiment of the circuit shown in FIG. 7 the switches 33, 34 and 35 must be replaced by some rapidly acting control devices, such as transistors, because they need to perform their switching action rapidly and accurately during each and every cycle of change of the control signals A and B.

A direct transistorization of the action of switch 33 and switch 34 will be self-evident to those skilled in the appropriate art. The use of transistors as switches is also fully shown in the transistor circuits of the other figures. However, a direct transistorization of switch 35 may not be immediately evident and in view of this, it is pointed out that in order to simulate the two-way switch 35 in a transistor circuit it is possible to use two transistors which are connected to operate in anti-phase. Thus, for example, in the circuit shown in FIG. 8, to be described presently, transistor $T_2$ and $T_3$ together constitute a two-way switch. These transistors have a common emitter connection and their bases are controlled by signals which are in anti-phase so that when one transistor is conducting the other is non-conducting. An analogous arrangement can evidently be used in a transistorized embodiment of FIG. 7.

An alternative form of detector circuit may provide for an extension of the pulses shown in FIG. 6(d) so that if they are immediately followed by pulses in FIG. 6(e) the detector system operates by detecting an overlap of the two pulses. The pulse extension may conveniently have the form shown in FIG. 6(g). In practice, it will probably not be necessary to extend both sets of pulses.

Here, the principle of operation is further modified owing to the realization that if only pulses obtained from one polarity coincidence detection are extended the gating action of the signal A can be dispensed with completely. Imagine, for example, that in FIG. 6 only the pulses in the wave form of FIG. 6(d) are extended as shown in FIG. 6(g). In the absence of the gating action of the signal A these pulses would be further modified to the form shown in FIG. 6(h). The pulse extension must be small. Detection is required of the state in which pulses in FIG. 6(e) are immediately following pulses in FIG. 6(d). Detection is not required of the state in which pulses in FIG. 6(d) follow immediately after pulses in 6(e). In the circuit shown in FIG. 7 the switch operated by the signal A discriminates between these two conditions.

Such an alternative detector circuit is shown in FIG. 8.

In the circuit shown in FIG. 8 this discrimination arises from the extension of a set of pulses generated on a particular one of two lines.

In FIG. 8 the switching devices, which are responsive to the polarities of the incoming signals, are transistors. The transistor $T_1$ has its collector-emitter circuit energized from a battery 39. An input signal B is applied to the base of this transistor $T_1$ through a suitable resistor $R_1$. For the purpose of the following explanation, the positive terminal of the battery 39 is assumed to be at zero potential. Thus, when the signal B is positive the transistor $T_1$ is non-conductive. On the other hand, when B is negative the transistor conducts. A resistor $R_2$ is included in the collector circuit of the transistor and the collector potential at a point X therefore has a near-zero value when B is negative and a relatively large negative value when B is positive. The collector of transistor $T_1$ is connected through independent resistors $R_3$ and $R_4$ to the collectors of transistors $T_2$ and $T_3$ respectively. The emitters of these transistors are connected indirectly to the positive terminal of the battery 39. Thus, the collectors of $T_2$ and $T_3$ have a near-zero potential unless B is positive and they are non-conductive. The bases of transistors $T_2$ and $T_3$ are respectively controlled by signal $A_\theta$ and $-A_\theta$ supplied respectively through resistors $R_5$ and $R_6$. Thus, when B is positive a strongly negative potential occurs at the collector of one of the transistors $T_2$ and $T_3$, the one whose input signal $A_\theta$ or $-A_\theta$ is positive. The result is that the collector potentials of transistors $T_2$ and $T_3$ will both have the character of a rectangular pulse wave form. If added these wave forms will correspond to a square wave comprising pulses of half-cycle duration corresponding to the positive half-cycles of the signal B. The relative widths of the pulses at the two collectors will depend upon the phase difference between B and the signal $A_\theta$.

The remainder of the circuit shown in FIG. 8 is required to indicate when the pulses at one collector, in this case the collector of transistor $T_2$, immediately precede the pulse at the other collector. The circuit is not required to detect the other state in which pulses at the collector of $T_3$ precede those at the collector $T_2$. As has been described, this distinction is made by extending the pulse appearing at the collector of $T_2$ and detecting "overlap" as between the pulses appearing at the two collectors. In the circuit shown transistor $T_4$ is used in a pulse stretching stage. The output from this stage is used to control the gating transistor $T_6$ through the intermediate biased amplifier stage comprising transistor $T_5$. As long as the base of transistor $T_4$ remains negative the transistor $T_5$ will be conducting and the gate provided by transistor $T_6$ would be held open. When the base of transistor $T_4$ is driven positive, $T_4$ cuts off, but owing to the presence of the capacitor $C_1$, which is connected across a resistor $R_7$ in the emitter circuit of $T_4$, the potential on the base of $T_5$ rises slowly in the positive sense. When the base potential of $T_5$ reaches a critical value, $T_5$ is cut off, the base potential of $T_6$ falls below that of the collector of $T_6$ so that this collector is short-circuited to the base. This latter state prevails until the base of $T_4$ is again driven negative.

The period of time between the cut-off of the transistor $T_4$ and the closure of the gate $T_6$ is largely determined by the time constant $C_1R_7$, which would normally (at 60 c.p.s.) be of the order of one millisecond or less.

The action of the circuit is then as follows. As long as the base of $T_4$ is negative the transistor $T_2$ must be cut off and the transistor $T_3$ must be conducting. Consequently, there is no output signal on the output line, that is between the emitter and collector of the transistor $T_6$. After the base of $T_4$ has been driven positive there is a short period during which $T_6$ is open and if during this period the transistor $T_1$ should be non-conducting a signal will appear briefly on the output line. The presence of this signal indicates the appropriate phase relationship between the input signals and serves to provide the detection afforded by the comparator.

A particular advantage of this circuit is that should transients occur in the input signals, these will only have an adverse effect if they are present whilst the gate $T_6$ is open.

It should be noted that the battery 39 may be supplied directly by the signal A provided the angle $\theta$ is not too small. Alternatively, the signal A could supply all of the transistor stages apart from those comprising transistors $T_2$ and $T_3$, which may conveniently be supplied directly from the signal B. It is presumed that if this were done the signals A and B would not vary too much in amplitude and that protecting diodes would be connected across the transistors to prevent them from conducting in the reverse direction.

It is convenient for the purpose of comparing the principle of phase comparison of the circuit shown in FIG. 8 with that of the system shown in FIG. 5 to present the principle of FIG. 8 in the tabular form already adopted. The relevant polarity tabulations are:

| $A_\theta$ | + | + | − | − |
|---|---|---|---|---|
| $-A_\theta$ | − | − | + | + |
| B | + | − | − | + |
| | $P_1$ | | | $P_2$ |

NO OUTPUT INDICATION

Case (i)

| $A_\theta$ | + | + | − | − |
|---|---|---|---|---|
| $-A_\theta$ | − | − | + | + |
| B | − | + | + | − |
| | | $P_1$ | $P_2$ | |

OUTPUT INDICATION

Case (ii)

The principle can be understood if it is supposed that a pulse $P_1$ is produced during periods of simultaneous positive polarity of the signals B and $A_\theta$. Similarly, a pulse $P_2$ is produced having a duration corresponding to periods of simultaneous positive polarity as between signals B and $-A_\theta$. An output indication is required when the pulse $P_2$ follows immediately after the termination of the pulse $P_1$ and in the circuit shown in FIG. 8 means for affording such an indication comprise a pulse extender provided by the energy storage action of the capacitor $C_1$. Thus the pulse $P_1$, which really corresponds to the energization condition of this storage circuit, will overlap the pulse $P_2$, which the controlling pulse supplied to transistor $T_5$, provided that the pulse $P_2$ follows immediately after the pulse $P_1$. Such a principle of operation is evident from the tabulations where Case (i) corresponds to no output indication and Case (ii) corresponds to an output indication. It is to be noted that as the table is read from left to right, this corresponds to a progressive time sequence.

Corresponding polarity tabulations applicable to the schematic circuit of FIG. 7 are:

| $A$ | − | + | + | + | − | − |
|---|---|---|---|---|---|---|
| $A_\theta$ | + | + | + | − | − | − |
| $B$ | + | + | − | − | − | + |

NO OUTPUT INDICATION
Case (i)

| $A$ | − | − | + | + | + | − |
|---|---|---|---|---|---|---|
| $A_\theta$ | + | + | + | − | − | − |
| $B$ | − | + | + | + | − | − |

OUTPUT INDICATION
Case (ii)

Here, Case (i) corresponds to conditions applicable to the chain-dotted curve of FIG. 6(c). The requirement for an output indication is that the signals A and B should be simultaneously positive once every cycle during a period of positive polarity of the signa $A_0$ and once every cycle during the period of negative polarity of the signal $A_0$. Evidently Case (i) yields no output indication. On the other hand, Case (ii) which corresponds to the full curve of FIG. 6(c) does satisfy the condition for an output indication. The object here is merely the detection of a condition in which two signals of indefinite phase relationship have a particular combination of polarities twice during a complete cycle of change, each such occurrence corresponding to a definite polarity period of a signal having a predetermined phase relationship with one of the other signals. An examination of all of the various possible alternative combination evident from the tabulations will show that this will provide a basis for discrimination between Case (i) and Case (ii).

An alternative and equally applicable basis of discrimination is obtained if two signals of definite phase relationship A and $A_\theta$ have a particular combination of polarities twice during a complete cycle of change, the polarity of the other signal B being different during these two events. It follows from this that the signals controlling switches 33, 34 and 35 in FIG. 7 can be interchanged in a variety of ways, all falling within the scope of this invention.

In principle, the phase comparators described so far detect a particular phase difference in that they serve to indicate whether the phase difference is less than or greater than a particular value. If this particular value as between a signal B and a signal A corresponds to the condition that B lags behind A by $\theta°$, the comparator really indicates when the phase difference is between $\theta$ lagging and 180° −$\theta°$ leading. The range covered is 180°. If it is required that the comparator should cover a range differing from 180° the principles already described require modification.

This invention provides two alternative methods of accomplishing the necessary modification. One of these, depicted in FIG. 11, involves the use of a self bias circuit which is applied to produce a D.C. offset in one of the signals (the signal B) so that periods of positive polarity are unequal to periods of negative polarity. This D.C. offset must be proportional to the amplitude of the basic signal. In FIG. 11 wave forms (a) and (b) correspond to the wave forms of FIG. 3(a) and FIG. 3(b) and wave forms (d) and (e) correspond to the wave forms of FIG. 3(c) and FIG. 3(d) respectively. FIG. 11(e) shows a self bias applied to the signals B of FIG. 11(b) to produce D.C. shifted signals denoted $B_s$. As will be seen, for the particular self bias indicated in the wave forms, neither of the signals of FIG. 11(b) will yield an output indication because the corresponding signals $B_s$ do not have negative polarity during a positive polarity period of the signal $A_0$. In view of this two other hypothetical B-type signals are introduced in FIG. 11(c). One of these, denoted by crosses, changes from negative to positive during the positive polarity period of the signal $A_0$. This leads to an output indication as will be evident from the foregoing description with reference to FIGS. 2 to 5. On the other hand, the signal, denoted by the circles, changes from positive to negative to positive during the positive periods of $A_0$ and this means that there will be no indication from the system. It is only when the onset of a positive polarity period of $A_0$ occurs during a negative period of $B_s$ that the relevant phase indication will be provided by the system. This means that the phase indication is restricted to a period which, owing to the self-bias imposed on the signal B, is less than half of a complete cycle of change. Had the self-bias been in the opposite sense, this period would be greater than half a cycle. It follows by the use of the self-bias principle in conjunction with the initial phase shift $\theta$ and the detector circuit of the kind shown in FIG. 2 that a phase angle comparator is provided which will indicate when the phase angle between two signals falls within a predetermined range not necessarily equal to 180 electrical degrees.

Figure 9A:
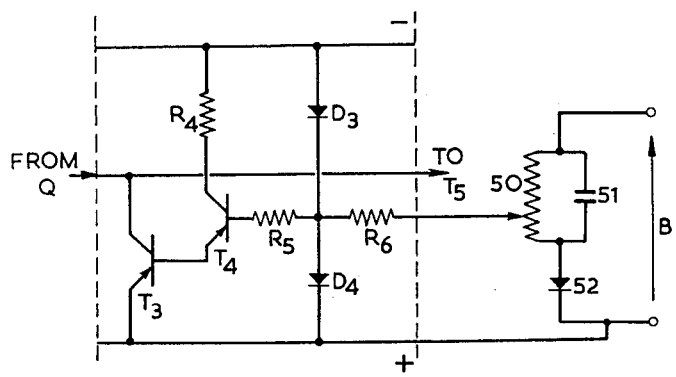

To illustrate the nature of the necessary circuit modifications of the system shown in FIG. 5, description will now be given of a suitable circuit as shown in FIG. 9(a). In principle, the modification consists in altering the control of one of the transistors $T_1$ o $rT_4$ (see FIG. 5) so that it is conductive for a period of differing from an exact half cycle. In FIG. 9(a) the control of the transistor $T_4$ is shown to be modified by a self bias circuit. The relevant part of FIG. 5 is reproduced between the broken lines. The signal B, instead of being applied directly between the positive line and the resistor $R_6$, is applied to a circuit consisting of a rectifier 52 connected in series with a parallel combination comprising a resistor 50 and a capacitor 51. The resistor 50 has an adjustable tapping which is connected to the resistor $R_6$. Thus, in operation, the D.C. signal set up across the rectifier 52 acts to provide a D.C. bias for the signal B, the effect of which is adjustable by altering the position of the tapping on the resistor 50. With the rectifier 52 connected as shown, the transistor $T_3$ is caused to conduct for less than a half cycle. If the rectifier were reversed, then $T_3$ would conduct for more than a half cycle.

An alternative way of adjusting the conductive periods of the transistors $T_3$ and $T_4$ consists in phase-shifting the signal B in two stages to produce two distinct signals which can be applied simultaneously to produce conduction in a transistor for a period greater than or less than a half cycle. In the applications now to be considered, the transistor $T_4$ is rendered conductive in response to the polarities of two signals both of which are produced from the signal B by suitable phase shift.

It is evident that a gating signal of the kind produced by the self-bias means already described can be produced merely by shifting the phase of the signal B to produce a signal $B_\phi$ and using an and/or gate responsive to both signals. Thus, in FIG. 12(a) the two signals B and $B_\phi$ are shown and it is supposed that a gating signal shown in FIG. 12(b) is produced when either or both of these signals have a positive polarity. The result is a gating signal having unequal periods of positive and negative polarity and it is self-evident how such a signal can be used to perform the functions of the signal $B_s$ of FIG. 11(c).

The circuit shown in FIG. 9(b) shows one way in which an input signal B may be subjected to two different phase shifts by capacitor 60 and resistor 61, and capacitor 62 and resistor 63, respectively. The resulting phase shift signals energize the primary windings of voltage transformers 64 and 65 respectively. The output signals from these transformers, denoted $B_1$ and $B_2$ respectively, are available from the circuit. In FIG. 9(b) protecting diodes $D_6$, $D_7$, $D_8$, $D_9$ and resistors $R_{10}$, $R_{11}$, $R_{12}$ and $R_{13}$ function in a manner analogous to diodes $D_3$, $D_4$ and resistors $R_5$ and $R_6$ in FIG. 5.

The signals $B_1$ and $B_2$ may be applied to control the transistor $T_3$ in a variety of ways; typical examples are shown in FIGS. 10(a), 10(b), 10(c), 10(d).

In the circuit shown in FIG. 10(a) the signals $B_1$ and $B_2$ are fed directly to the base of the transistor $T_4$ through diodes $D_{10}$ and $D_{11}$ respectively. With this circuit $T_4$ is conductive when either or both of the signals $B_1$ and $B_2$ is/are negative. The effect of this is to modify the range of phase angle detection of the comparator to an extent determined by the phase shifts afforded by capacitor 60, resistor 61, capacitor 63 and resistor 62.

In FIG. 10(b) the diodes of FIG. 10(a) are eliminated by introducing a further transistor $T_4'$ in parallel with a transistor $T_4$. These two transistors function as two parallel connected switches, the conductive action of original transistor $T_4$ being present when either transistor conducts. The bases of the two transistors are energized respectively by the signals $B_1$ and $B_2$. Accordingly, the circuit becomes conductive when either or both of the signals $B_1$ and $B_2$ is/are negative.

The arrangement shown in FIG. 10(c) is the same as that shown in FIG. 10(a) except in that both of the diodes $D_{10}$ and $D_{11}$ are reversed and an additional resistor $R_{13}$ is connected directly between the negative supply and the base of the transistor $T_4$. With this circuit if either $B_1$ or $B_2$ is positive transistor $T_4$ is non-conductive. The transistor is only conductive when both of the signals $B_1$ and $B_2$ are negative at the same time. Thus, in this case the transistor $T_4$ is conductive for less than a half cycle once per cycle whereas in the circuit shown in FIGS. 10(a) and 10(b) the transistor $T_4$ or its equivalent from the point of view of the operation of the circuit shown in FIG. 5, is conductive for more than half a cycle.

An alternative circuit is shown in FIG. 10(d). In this case the output signals $B_1$ and $B_2$ from the phase shifting device are not referenced to a common reference level. The necessary modification of the circuit of FIG. 9(b) is shown in FIG. 10(d). The signals $B_1$ and $B_2$ in this case are applied to control two transistors $T_4$ and $T_4'$ respectively. These transistors have their collector-emitter circuits connected in series as shown and only conduct current when they are simultaneously conductive. This is when the signals $B_1$ and $B_2$ are simultaneously negative and so the operation of the circuit is analogous to that of the circuits of FIGS. 10(a) and 10(b).

What we claim as our invention, and desire to secure by Letters Patent, is:

1. A phase angle comparator operative to compare the phase angle between two alternating electrical input signals comprising, in combination, phase shift means formed by a reactive circuit connected as an input stage to the comparator to accept directly both input signals and phase shift at least one of them to alter their phase difference by a predetermined amount and provide these signals as output signals in their form following phase-shift, a polarity sensitive electrical detector connected to provide the output indication of the comparator in response to one of said output signals, to be referred to as the first signal, when this signal experiences a predetermined change of polarity, and gate means controlled by the other one of said output signals, to be referred to as the second signal, and connected to condition the action of the polarity sensitive electrical detector to permit a said output indication only when the signal controlling the gate means has a predetermined polarity.

2. A phase angle comparator operative to compare the phase angle between two alternating electrical input signals comprising, in combination, phase shift means formed by a reactive circuit connected as an input stage to the comparator to accept both input signals and phase shift at least one of them to alter their phase difference by a predetermined amount and provide these signals as output signals in their form following phase-shift, a polarity sensitive electrical detector comprising an electrical energy storage network including a unidirectional conductive device connected to permit the rapid storage of energy by said network whilst restraining the discharge of this energy, said polarity sensitive electrical detector being connected to provide the output indication of the comparator in response to one of said output signals, to be referred to as the first signal, when this signal experiences a predetermined change of polarity, gate means controlled by the other one of said output signals, to be referred to as the second signal, and connected to condition the action of the polarity sensitive electrical detector to permit a said output indication only when the signal controlling the gate means has a predetermined polarity, said gate means comprising a switch device connected in shunt with the unidirectional conductive device of said polarity sensitive electrical detector and responsive to said second signal to short-circuit this unidirectional conductive device during its half-cycle periods of a predetermined polarity, a source of electrical energy, a switching device connected between this source of energy, and the energy storage network and responsive to said first signal to permit the admission of energy from said source to said network only during its half-cycle periods of a predetermined polarity, and an output stage connected to supply an output network indicating the level of energy stored in the storage network but including a smoothing network connected to render this output signal insensitive to short duration rapid changes of the energy stored in said network, whereby to condition the energy storage network so that it may only retain energy for periods adequate to provide an output signal from the detector provided the polarity of said second signal is such that the switch device which it controls is open when the polarity of said first signal changes to admit energy from said energy source to the energy storage network.

3. A phase angle comparator operative to compare the phase angle between two alternating electrical input signals comprising, in combination, phase shift means formed by a reactive circuit connected as an input stage to the comparator to accept both input signals, to be denoted A and B, and phase shift the signal A by a predetermined amount and provide this phase-shifted signal as said first signal, provide the signal B as said second signal, and also provide without phase shift the signal A as a third signal, a polarity sensitive electrical detector comprising an electrical energy storage network, a source of electrical energy, an output network, a one-way switching device responsive to said third signal to admit or block electrical signals according to the polarity of this signal, and a two-way switching device having its common pole connected through said one way switching device to said electrical energy storage network, and its other poles connected to said source of electrical energy and said output network respectively, and operative in response to said first signal to provide a connection between the common pole and the output network when this signal has one polarity and a connection between the common pole and the source of electrical energy when this signal has the opposite polarity, and gate means comprising a further switching device connected between said one-way switching device and said energy storage network and responsive to said second signal to connect the energy storage network with said one-way switching device only during its half-cycle periods of a predetermined polarity.

4. A phase angle comparator operative to compare the phase angle between two alternating electrical input signals comprising, in combination, phase shift means formed by a reactive circuit connected as an input stage to the comparator to accept both input signals and phase shift at least one of them to alter their phase difference by a predetermined amount and provide these signals as output signals in their form following phase-shift, a polarity sensitive electrical detector connected to provide the output indication of the comparator in response to one of the said output signals, to be referred to as the first signal, when this signal experiences a predetermined change of polarity, and gate means controlled by the other one of said output signals, to be referred to as the second signal, and connected to condition the action of the polarity sensitive electrical detector to permit a said output indication only when the signal controlling the gate means has a predetermined polarity, said polarity sensitive electrical detector comprising pulse generating circuit means having two output lines and operative in response to said first signal to supply a signal along one output line when said fiirst signal has positive polarity and to supply a signal along the other output line when said first signal has negative polarity but the signal supply along both lines being subject to the gating action of said gate means, pulse extension means connected in at least one of said output lines and operative to extend slightly the pulses supplied along this line, and detector means responsive to signals supplied along both said output lines after pulse extension and operative to detect when the pulse signals of both lines overlap in time duration, and said gate means being connected to co-act with the pulse generating circuit means to condition the operation of this circuit means by permitting pulse generation only during periods when said second signal has a predetermined polarity.

5. A phase angle comparator according to claim 4, which further comprises a D.C. biasing stage connected as an intermediate stage of the comparator to respond to one of said first or second input signals and operative to impose a D.C. bias on this signal proportional to its A.C. amplitude before it is applied to control the output of the comparator.

References Cited in the file of this patent

UNITED STATES PATENTS

| | | |
|---|---|---|
| 2,597,796 | Hindall | May 20, 1952 |
| 2,629,834 | Trent | Feb. 24, 1953 |
| 2,644,133 | Soukaras | June 30, 1953 |
| 2,688,695 | Odell | Sept. 7, 1954 |
| 2,729,808 | Auerbach | Jan. 3, 1956 |
| 2,730,632 | Curtis | Jan. 10, 1956 |
| 2,820,143 | D'Nelly | Jan. 14, 1958 |
| 2,864,950 | Pernick | Dec. 16, 1958 |

OTHER REFERENCES

"Electromechanical Phase Indicator," article by S. Wald in Radio and Television News, July 1949, pages 14–15.